July 27, 1937.　　　　J. C. McCUNE　　　　2,088,530
SAFETY CAR CONTROL EQUIPMENT
Filed May 6, 1936　　　2 Sheets-Sheet 1

INVENTOR
JOSEPH C McCUNE
BY Wm. M. Cady
ATTORNEY

July 27, 1937.　　　　J. C. McCUNE　　　　2,088,530
SAFETY CAR CONTROL EQUIPMENT
Filed May 6, 1936　　　　2 Sheets-Sheet 2

INVENTOR
JOSEPH C. McCUNE
BY Wm. M. Cady
ATTORNEY

Patented July 27, 1937

2,088,530

UNITED STATES PATENT OFFICE 2,088,530

SAFETY CAR CONTROL EQUIPMENT

Joseph C. McCune, Edgewood, Pa., assignor to The Westinghouse Air Brake Company, Wilmerding, Pa., a corporation of Pennsylvania Application May 6, 1936, Serial No. 78,117

17 Claims. (Cl. 303—6.1)

This invention relates to fluid pressure brake systems and more particularly to pneumatic remote controlled safety car equipment.

It is an object of this invention to provide pneumatic remote control safety car equipment that is simple in construction and operation and that requires a minimum of piping.

It is another object of this invention to provide a pneumatic remote control safety car equipment in which a minimum of time is required to effect an application or a release of the brakes.

It is a further object of this invention to provide a brake equipment of the character indicated in which brake cylinder pressure is maintained during the braking operation.

It is a still further object of this invention to provide a brake equipment of the character described in which the car doors can not be automatically opened until after a predetermined brake application has been made.

Figure 1:
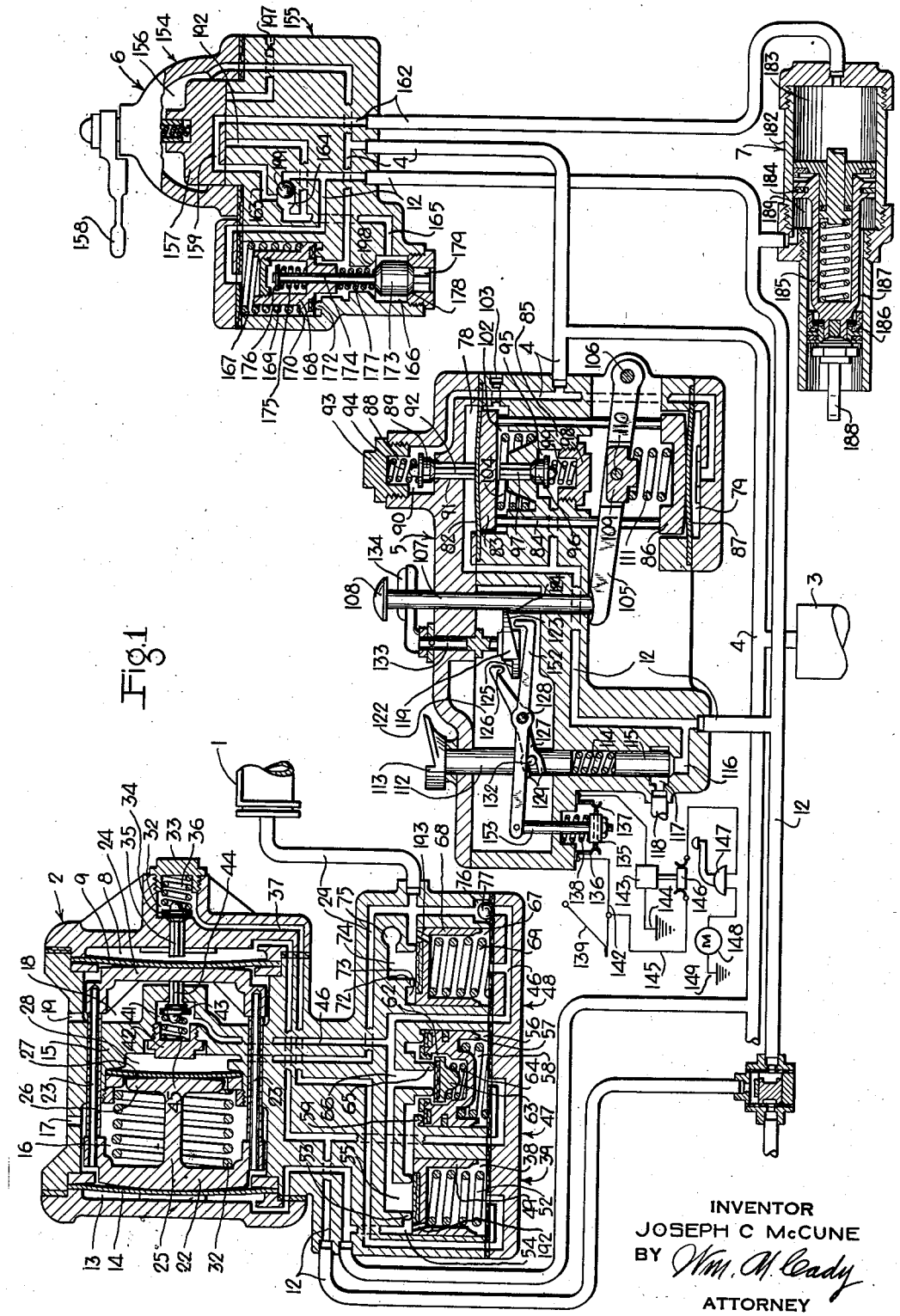
Figure 2:
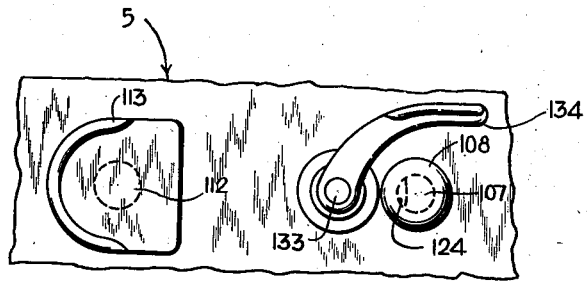
Figure 3:
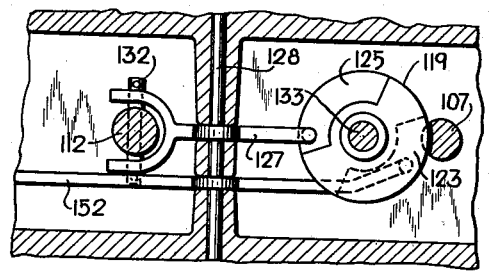
Figure 4:
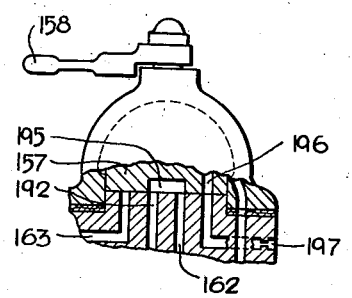

Other objects and advantages of my invention will be apparent from the following description taken with the accompanying drawings, in which, Fig. 1 is a diagrammatic view of apparatus constituting one preferred embodiment of my invention, Fig. 2 is a detailed plan view showing the foot valve control equipment, Fig. 3 is a sectional view of a portion of the brake valve device shown in Fig. 1, and Fig. 4 is a diagrammatic view of the door valve device shown in position to open the car door.

Referring to the drawings, and particularly to Fig. 1 thereof, the brake system comprises a brake cylinder 1, that is supplied with fluid under pressure by a control valve device 2 from a main reservoir 3 through a main reservoir pipe 4 as controlled by a brake valve device 5. A door operating valve device 6 is provided for controlling a door engine 7 for operating the car doors.

The control valve device 2 comprises a casing providing a chamber 8 in one end of the upper portion thereof, one side of which is bounded by a movable flexible diaphragm 9, and that is in constant communication with a brake pipe 12. The opposite end of the upper part of the casing which provides a chamber 13 is bounded on one side by a movable flexible diaphragm 14, and has constant open communication with the main reservoir pipe 4. A partition wall 15 is provided between the chambers 8 and 13 dividing this space into a chamber 16 that is in open communication with the atmosphere through a port 17, and a chamber 18 that is also in constant open communication with the atmosphere through a port 19. A follower 22 is provided adjacent the inner side of the diaphragm 14 and is connected by spacing rods 23 to a follower 24 positioned adjacent the diaphragm 9, the followers 22 and 24 being so spaced by the rods 23 as to be maintained in continuous contact with the diaphragms 14 and 9, respectively, to form a movable diaphragm stack for a purpose to be later described. A stem 25 is provided on the follower 22 at the inner end of which a follower 26 is provided that constantly engages a diaphragm 27 forming one side of a chamber 28 within the partition wall 15 that is in constant open communication with the brake cylinder 1 through passage and pipe 29.

The right hand end of the casing of the control valve device 2 provides an application valve chamber 32 that is closed by a plug 33, and which contains an application valve 34 having a stem 35 extending through a bore in the casing wall and adapted to be engaged by the diaphragm 9 upon movement thereof toward the right. The chamber 32 contains a spring 36 one end of which engages within a cavity in the plug 33, and the other end of which engages the application valve 34 to bias it to its seat. The application valve chamber 32 is in constant open communication, through passage 37, with a piston chamber 38 of an application relay valve device 39. There is also provided, within the partition 15, a release valve chamber 41 closed by a plug 42 between the diaphragm chamber 28 and the chamber 41, and containing a release valve 43 having a stem 44 extending through a bore in the casing wall and adapted to engage the follower 24. A spring 45 is provided within the release valve chamber 41, one end of which engages within a cavity in the plug 42 and the other end of which engages the release valve 43 for urging the valve 43 toward its seat. The release valve chamber 41 is connected by means of a passage 46 to the application relay valve device 39, to the emergency relay valve device 47, and to the piston chamber of the release relay valve device 48 to be presently described.

In the lower portion of the control valve casing is provided the aforenamed application relay valve device 39, emergency relay valve device 47, and release relay valve device 48. The application relay valve device 39 comprises the aforenamed piston chamber 38 containing a spring weighted valve piston 49 that is urged by a spring 52 upwardly against a rib seat 53 to normally control communication between a chamber 54 that is in constant communication with the main reservoir pipe 4, and a chamber 55 that is in communication through the passage 46 with the release valve chamber 41.

The emergency relay valve device 47 comprises a chamber 56 provided within the casing and containing a spring weighted valve piston 57 that is urged upwardly by a spring 58 provided within the chamber 56 to engage a rib stop 59. A chamber 62 is provided centrally within the valve piston 57 and contains a spring weighted valve 63 which is urged by the spring 64 mounted within the chamber 62 upwardly against a rib seat 65 to normally close communication between the chamber 53, that is in constant open communication with the main reservoir pipe 4, and a chamber 66 that is in constant open communication with the release valve chamber 41 through passage 46. As is clearly shown in the drawings, the valve piston 57 has an inwardly extending flange formed thereon and adapted on movement of the valve piston 57 against the spring 58 to engage the periphery of the valve 63 and move it away from the seat rib 65 against the spring 64.

The release relay valve device 48 comprises a piston chamber 67 provided in the casing and containing a spring weighted valve piston 68 that is urged upwardly by a spring 69 to a rib seat 72 to control communication between a chamber 73 that is in constant open communication with the brake cylinder 1, and a chamber 74 that is in constant open communication with the atmosphere through an exhaust port 75. A check valve chamber 76 is provided between the passages 46 and 29 and contains a check valve 77 for permitting the flow of fluid under pressure from the passage 46 to the passage 29 and to the brake cylinder, and for preventing the flow of fluid under pressure in the reverse direction.

The brake valve device 5 comprises a casing containing a chamber 78 that is in constant open communication with brake pipe and passage 12, and a chamber 79 that is in constant open communication with main reservoir passage and pipe 4, and between which is positioned a diaphragm stack comprising a diaphragm 82, forming one wall of the chamber 78 and a follower 83 adjacent thereto that is attached in spaced relation by rods 84 to a follower 86, that is adjacent a diaphram 87 comprising one wall of the chamber 79. The rods 84 for spacing the followers 83 and 86 extend through bores in a partition wall 85 in the casing structure.

A brake pipe charging valve chamber 88 is provided above the diaphragm stack and is in constant communication with the main reservoir passage and pipe 4, and contains a brake pipe charging valve 89 having a stem 92 extending through a bore in the casing into the chamber 78 to engage the diaphragm 82. The outer side of the chamber 88 is closed by a cap 93 having a cavity therein for receiving one end of a spring 94, the lower end of which engages the valve 89 to urge it toward its seat. A release valve chamber 95 is provided within the partition 85 and contains a release valve 96 having a stem 97 extending upwardly through a bore in the casing wall and adapted to engage the follower 83. The lower side of the chamber 95 is closed by a cap 98 having a cavity therein for accommodating one end of a spring 99, the upper end of which engages the valve 96 and urges it toward its seat. A space between the partition 85 and the diaphragm 82 provides a chamber 102 that is in constant open communication with the atmosphere through an exhaust port 103 and which contains a spring 104, the lower end of which engages the partition 85 and the upper end of which engages the follower plate 83 to urge the diaphragm stack upwardly.

To provide for manual movement of the diaphragm stack a lever 105 is provided, one end of which is pivoted on the pin 106 mounted on the casing, and the other end of which is adapted to be moved by a rod 107 that extends upwardly through the brake valve casing structure and terminates in an operating button 108. The lever 105 is connected to the diaphragm stack by means of a member 109 pivoted to the lever 105 by a pin 110 and adapted to engage the upper end of a spring 111, the lower end of which engages within a cavity in the follower plate 86.

An emergency mechanism is provided on the brake valve device 5 comprising a rod 112 extending downwardly within the casing and provided with a heel rest 113 on the upper end thereof. The lower end of the rod 112 engages the upper end of a spring 114 provided within a bore in the casing structure, and the lower end of which engages an emergency valve 115 for controlling communication between a chamber 116 that is in constant communication with the brake pipe 12, and a chamber 117 that is in constant communication with the atmosphere through an exhaust port 118. It is necessary upon charging the system to maintain pressure on the heel rest 113 to prevent an emergency application of the brakes.

Locking means are provided on the brake valve device for preventing an emergency application of the brakes after a service application thereof should pressure be thereafter released from the heel rest 113. This lock comprises a cam 119 provided within a chamber 122 in the casing structure and having a cam face 123 on the under side thereof for engaging a notch 124 on the rod 107 to hold the rod in its lower or brake applying position, and a cam face 125 on the upper side thereof for engaging the operating end 126 of a lever 127 mounted on a pin 128, and provided with a bifurcated end for engaging a pin 132 extending through the rod 112. A shaft 133 having an operating handle 134 is provided for actuating the cam 119, which may be actuated to urge the rod 107 downwardly to effect a service application of the brakes, and to actuate the lever 127 in a counter-clockwise direction to increase the pressure on the spring 114 and maintain the emergency valve 115 seated so as to prevent an emergency application of the brakes during said service application thereof.

A switch is provided on the brake valve device comprising a movable contact member 135 for engaging fixed contact members 136 and 137, and normally urged into engagement therewith by a spring 138 to close a circuit from the overhead trolley 139 through conductor 142, switch contact members 136, 135 and 137, and the winding of a relay 143 to ground at 144 to maintain the relay energized and in its upper or circuit closing position. In this position of the relay, trolley voltage is brought from the trolley 139 through conductor 145 and relay contact member 146 to the manual controller 147, which, when the controller is in a motoring position, closes a circuit through the car motor 148 to ground at 149 to supply power for driving the car. When the lock device is moved to a position to hold the manually operable member 107 in a brake applying position and the emergency valve 115 seated, the right hand end of the lever 152 is forced downwardly by the face 123 of the cam 119, thus rotating the lever 152 in a clockwise direction about the pin 128, and moving the left hand end upwardly to move the switch contact member 135 by means of the connecting rod 153 against the bias of the spring 138 to a circuit interrupting position to deenergize the relay 143 and permit the contact 146 to drop to its open or circuit interrupting position to prevent the supply of power to the motor 148.

The door operating valve device 6 comprises a body portion 154 and a bracket portion 155. The body portion comprises a casing defining a valve chamber 156 that is in constant communication with the main reservoir passage and pipe 4, and contains a rotary valve 157 that is adapted to be operated by a handle 158, and is provided with a cavity 159 on the face thereof for connecting a door closing pipe and passage 162 to the main reservoir passage and pipe 4 in a manner to be later described.

The bracket portion 155 of the door valve device comprises a casing providing a piston chamber 167 that is in constant open communication with the brake passage and pipe 12, and which contains a spring weighted piston 168 that is forced downwardly by a spring 169 into engagement with a rib seat 172, the spring 169 surrounding the main body portion of the piston 168, the lower end engaging a shoulder 170 thereon and the upper end engaging the upper wall of the chamber 167. A door interlock valve chamber 166 is also provided within the casing, and contains a door interlock valve 173 having a stem 174 extending upwardly therefrom through a bore in the lower part of the piston 168 into a chamber in the central portion of the piston, and which contains a spring 175 surrounding the stem 174, the lower end of which engages the inner wall of the central chamber, and the upper end of which engages a head 176 carried by the valve stem 174 for biasing the valve and stem upwardly. A spring 177 is provided about the lower portion of the stem 174, the upper end of the spring engaging the under side of the piston 168, and the lower end of the spring engaging the valve 173. When the piston 168 is in its illustrated position in contact with the rib seat 172, the force of the spring 177 is greater than that of the spring 175, thus forcing the valve 173 downwardly into engagement with the valve seat 178 to close communication from the passage 165 to the atmosphere through the exhaust port 179.

The door engine 7 for operating the entrance and exit doors of the car comprises a casing 182 providing a piston chamber 183 containing a piston 184 therein that is provided with a stem 185 having a piston 186 thereon of less diameter than the piston 184, and adapted to operate within a bore 187, and one side of which is open to the atmosphere. An operating rod 188 is connected with the piston stem 185 and is pivotally connected to operate mechanism (not shown) for opening and closing the car doors. A chamber 189, provided between the pistons 184 and 186 is in constant open communication with the brake pipe 12. Fluid under pressure is normally supplied to the piston chamber 183 through the door valve device 6. When, however, the chamber 183 is vented in a manner to be hereinafter described, the greater fluid pressure within the chamber 189 acting on the left face of the piston 184 causes the piston to move to the right to effect the opening of the car doors.

Charging the system

The system is charged by the flow of fluid under pressure from the main reservoir 3 to the main reservoir pipe 4, from which the diaphragm chamber 13 and the chamber 54 above the application relay valve piston 49 and the emergency valve relay piston 57 is charged. Fluid under pressure also flows from the main reservoir pipe 4 to the door valve device 6 charging the valve chamber 156 and the door interlock valve chamber 166, thus building up pressure on the under side of the door interlock valve piston 168. From the valve chamber 166 fluid under pressure flows through passage 165, check valve chamber 164, passage 163 and the cavity 159 in the rotary valve 157, through passage and pipe 162 to charge the piston chamber 183 of the door engine 7, thus maintaining the piston 184 in its illustrated or door closing position. Fluid under pressure also flows from the passage 165 through passage 192 to a port in the valve seat below the rotary valve 157. Fluid under pressure also flows from the main reservoir pipe 4 to charge the diaphragm chamber 79 on the foot valve device 5, and to the brake pipe charging valve chamber 90.

As the diaphragm chamber 79 is charged, the diaphragm stack comprising the diaphragms 81 and 82 together with the followers 86 and 83 is forced upwardly by the pressure on the under side of the diaphragm 81 aided by the pressure of the spring 104 on the under side of the follower 83, thus releasing the pressure of the follower 83 on the stem 97 and permitting the release valve 96 to be forced to its seat by the spring 99, and forcing the brake pipe charging valve 89 upwardly from its seat to permit the flow of fluid under pressure from the chamber 90 through the bore 91 into the diaphragm chamber 78 and to the brake passage and pipe 12. During charging of the brake pipe 12 and thereafter it is necessary that the operator maintain pressure on the heel rest 113 to prevent "dead man" emergency application of the brakes.

Fluid under pressure from the brake pipe 12 flows to the piston chamber 189 of the door engine device 7, and to the interlock piston chamber 167 of the door valve device 6, charging these chambers. Fluid under pressure also flows from the brake pipe 12 to the control valve device 2 to charge the piston chamber 56 of the emergency relay, and to charge the diaphragm chamber 8. As the diaphragm chamber 13 is charged from the main reservoir pipe 4, the diaphragm stack comprising diaphragms 14, 27 and 9 is moved toward the right against the bias of the spring 36, permitting the valve 43 to be seated by the spring 45, the diaphragm 9 engaging the stem 35 of the release valve 34 and forcing the valve from its seat against the bias of the spring 36 to permit the flow of fluid under pressure from the diaphragm chamber 8 to the release valve chamber 32, and therefrom through passage 37 to the piston chamber 38 on the under side of the application valve piston 49. When the pressure in the brake pipe has built up sufficiently that the pressure within the diaphragm chamber 8 acting on the diaphragm 9 plus the force on the spring 36 becomes equal to or slightly greater than the force on the diaphragm 14, the diaphragm stack will move toward the left sufficiently to permit release valve 34 to be seated by the spring 36 to close communication from the diaphragm chamber 8 to the piston chamber 38, and to unseat the valve 43 to again open communication from the chamber 41 to the atmosphere. A small passage 192 through the application relay piston 49 permits the complete equalization of pressures on the two faces of the piston, the piston being held to its seat by the pressure of the spring 52. Likewise, the emergency relay valve piston 57 is normally held to its seat by the force of the spring 58 plus the force of fluid under pressure at brake pipe pressure within the piston chamber 56 urging the piston upwardly against the main reservoir pipe pressure within the chamber 54.

It will be noted that the diaphragm stack of the foot valve device 5 is forced upwardly by the main reservoir pipe pressure within the chamber 79 acting against the diaphragm 87, and also by the force of the spring 104, so that the downward pressure on the diaphragm 82 within the chamber 78 will not become sufficient to cause the brake pipe charging valve 89 to seat by the brake pipe pressure alone so that the brake pipe is charged to main reservoir pipe pressure.

Operation

When the operator wishes to apply the brakes, he presses his foot down on the button 108 to lower the button and the rod 107 an amount depending upon the desired degree of application of the brakes. The rod 107 and the lever 105 are thus forced downwardly to cause a compression of the spring 111 to effect a downward force on the follower 86 of the diaphragm stack corresponding to the amount of compression of the spring. This downward force on the diaphragm stack, in addition to the pressure within the chamber 78 acting downwardly on the diaphragm 82, causes the diaphragm stack to move downwardly to permit the seating of the brake pipe charging valve 89, and to force the valve 96 from its seat against the bias of the spring 99 to effect a reduction in brake pipe pressure by the flow of fluid under pressure from the brake pipe through valve chamber 95, past the unseated valve 96 to the atmosphere through chamber 102 and exhaust port 103. The reduction in brake pipe pressure, for any given position of the button 108 and rod 107, will continue until the pressure within the chamber 78, plus the pressure of the spring 111, has been reduced to slightly less than the upward pressure of the spring 104, plus the upward pressure within the chamber 79 against the diaphragm 87, which upward pressure forces the diaphragm stack upwardly to permit the valve 96 to seat.

Upon the reduction in brake pipe pressure, the pressure within the diaphragm chamber 8 of the control valve device 2 is correspondingly reduced, thus disturbing the balance of pressures on the diaphragm stack and permitting the diaphragm stack to move toward the right to permit the seating of the valve 43 to close communication from the central chambers 55 and 66 above the application relay piston 49 and the emergency relay piston 57, respectively, and from the release relay piston chamber 67 to the atmosphere through passage 46, chamber 18 and port 19. Upon the movement of the diaphragm stack toward the right, the diaphragm 9 engages the stem 45 of the application valve 34, thus forcing the valve 34 from its seat and permitting a reduction in pressure within the piston chamber 38 of the application relay valve device to brake pipe pressure. Upon a predetermined slight decrease in pressure within the chamber 38, the upward force of the spring 52 plus the pressure within the chamber 38 against the valve piston 49 becomes less than the downward force of pressure within the chamber 54 around the outer rim of the piston 49, thus forcing the piston 49 downwardly and permitting the flow of fluid under pressure from main reservoir pipe 4 through chamber 55, passage 46 to the piston chamber 67 of the release relay valve device, and past the unseated check valve 77, through the passage and pipe 29 to the brake cylinder 1. As pressure builds up within the brake cylinder 1, pressure correspondingly builds up within the chamber 73 above the release relay piston 68, which is held to its seat by the pressure within the piston chamber 67 plus the pressure of the spring 69. Pressure at brake cylinder pressure also builds up within the diaphragm chamber 28 located centrally of the diaphragm stack of the control valve device 2, creating a force on the diaphragm 27 tending to move the diaphragm stack toward the left, which pressure at some predetermined brake cylinder pressure becomes sufficient to move the diaphragm stack sufficiently to permit the seating of the valve 34, thus permitting an equalization of the pressures on the two sides of the application relay piston 49 by the flow of fluid under pressure from the chamber 54 into the piston chamber 38 through the small port 192 in the piston. The piston 49 will thus be forced upwardly to its seat by the spring 52, closing communication from the main reservoir pipe 4 to the brake cylinder 1.

If, for any reason, fluid under pressure leaks from the brake cylinder after an application of the brakes causing a reduction in brake cylinder pressure, a corresponding reduction in pressure takes place in the diaphragm chamber 28, thus reducing the force on the diaphragm 27 tending to force the diaphragm stack toward the left and permitting the diaphragm stack to move toward the right an amount sufficient to again unseat the valve 34, and cause movement of the valve piston 49 from its seat to supply further fluid under pressure to the brake cylinder until the pressure in the brake cylinder and the diaphragm chamber 28 is sufficient to again cause the valve 34 to seat. It will thus be seen that the control valve 2 operates to maintain brake cylinder pressure at a value corresponding to the reduction in brake pipe pressure by automatic operation of the diaphragm stack.

When the operator wishes to release the brakes, pressure is released from the button 108, thus allowing the lever 105 to move upwardly and release the downward pressure of the spring 111 on the follower 86. The diaphragm stack of the control valve device thus moves upwardly because the pressure within the chamber 79 acting on the diaphragm 87, plus the pressure of the spring 104, is greater than the pressure within the chamber 78 acting on the diaphragm 82. Upon this upward movement of the diaphragm stack, the diaphragm 82 engages the stem 92 of the brake pipe charging valve 89, forcing it upwardly from its seat and permitting the flow of fluid under pressure from the main reservoir pipe 4 to the brake pipe 12, as above described for charging the system. As the pressure within the brake pipe builds up, the pressure correspondingly builds up within the diaphragm chamber 8 of the control valve device 2, thus forcing the diaphragm stack toward the left, the follower 24 engaging the stem 44 of the brake cylinder exhaust valve 43, which is forced toward the left against the bias of the spring 45, to effect the release of fluid under pressure from the piston chamber 67 of the release relay valve device through passage 46, valve chamber 41, chamber 18 and exhaust port 19. The check valve 77 prevents fluid at brake cylinder pressure from flowing into the piston chamber 67, and the pressure within the chamber 73 on the upper side of the piston 68 forces the piston 68 downwardly against the bias of the spring 69 to effect the rapid venting of the brake cylinder through chamber 74 and exhaust port 75 until the pressure has been reduced sufficiently to permit the piston 68 to be forced to its seat 72 by the spring 69. Thereafter the brake cylinder is maintained in communication with the atmosphere through the small opening 193 in the piston 68, passage 46, and past the unseated brake cylinder release valve 43.

To effect a "dead man" emergency application of the brakes, pressure is released from the heel rest 113 of the brake valve device 5, permitting the rod 112 to be forced upwardly by the rod spring 114, and relieving pressure on the spring 114 that normally holds the emergency valve 115 to its seat. The emergency valve 115 is, therefore, unseated by brake pipe pressure to effect the release of fluid under pressure from the brake pipe 12 through exhaust port 118 to effect a rapid reduction in brake pipe pressure. During the upward movement of the rod 112, the pin 132 therein (see Figs. 1 and 3) engages the under side of lever 152 and raises the switch contact member 135 to a circuit interrupting position to interrupt the supply of power to the motor 148 independently of the position of the controller 147.

Upon the reduction in brake pipe pressure, the diaphragm stack of the control valve device 2 comprising diaphragms 14, 27 and 9 operates in the manner above described under service application of the brakes to effect the supply of fluid under pressure to the brake cylinder. The emergency relay piston 57 is also moved downwardly against the bias of the spring 58 upon a sufficient reduction in brake pipe pressure resulting in a corresponding reduction in the pressure within the piston chamber 56. On this movement of the valve piston 57, the valve 63 is moved away from the seat rib 65, as explained above, thus also effecting the supply of fluid under pressure past the unseated valve 63 through chamber 66, passage 46, past the check valve 77 to the brake cylinder 1. The spring 58 on the under side of the emergency relay piston 57 is designed to create a relatively strong upward force on the piston to prevent its unseating until a substantial reduction in brake pipe pressure has been effected, or considerably in excess of the reduction required in the chamber 38 to cause the piston 49 of the application relay valve device 39 to move from its seat. By virtue of the relatively strong force exerted by the spring 58, the piston 57 is moved upwardly again upon a relatively small increase in brake pipe pressure, thus forcing the valve 63 to its seat 65 to prevent the flow of fluid under pressure from the main reservoir pipe 4 through chambers 54 and 66, passage 46, valve chamber 41, and chamber 18 to the atmosphere as might happen should the piston 57 of the emergency relay valve device remain unseated after the diaphragm stack of the control valve device 2 has been moved to release position.

By means of the lock comprising the operating handle 134 and the cam 119 it is possible to lock the brake valve device 5 in service application position by holding the rod 107 in any desired position by the cam 119, the lever 127 holding the heel rest 113 in its lower position to maintain the valve 115 seated. At the same time the cam 119 operates the switch element 135 to its circuit interrupting position, thus interrupting the power supply to the car motor 148. This locking mechanism may be employed to prevent an emergency application following a service application, such as while changing over the control of the car from one end to the other, it being impossible to start the car from one end while the locking mechanism at the opposite end is in the locked position, since a service application of the brakes will be maintained and the power supply to the motors will remain interrupted.

When the operator wishes to open the car doors, the handle 158 of the door valve device 6 is moved from the position shown in Fig. 1 to the position shown in Fig. 4, bringing a cavity 195 in the rotary valve 157 (see Fig. 4) to a position to effect communication between the passages 162 and 192, thus connecting the piston chamber 183 of the door engine 7 to the valve chamber 166 of the interlock valve device. Should this operation of the door valve 157 be made prior to a sufficient reduction in brake pipe pressure to move the interlock valve 173 from its lower seat, the door engine will not be operated since the chamber 183 is prevented from being vented by the seated interlock valve 173. If, however, a sufficient reduction in brake pipe pressure has been effected so that the pressure in the piston chamber 167, plus the downward force of the spring 169, is less than the force of fluid under pressure at main reservoir pipe pressure applied to the under side of the piston 168, this piston will move upwardly, bringing the valve 173 into engagement with its upper seat 198, thus venting the piston chamber 183 of the door engine to the atmosphere through exhaust port 179. In its upper position the valve 173 closes communication from the main reservoir pipe 4 to the valve chamber 166, thus preventing the venting of the main reservoir pipe.

When the piston chamber 183 is vented through exhaust port 179, as above described, the greater pressure within the piston chamber 189 forces the piston 184 together with the stem 185 and the connecting rod 188 toward the right, the rod 188 operating the door mechanism, not shown, to open the car door. When the rotary valve 157 is in the position illustrated in Fig. 4, a port 196 therein connects the valve chamber 156, which is maintained at main reservoir pressure, to the atmosphere through a restricted exhaust port 197, thus giving a warning to the operator that the handle 158 is in the door opening position. Upon an increase in brake pipe pressure to release the brakes, a corresponding increase in pressure in the piston chamber 167 of the door interlock valve device 6 causes the piston 168 to be forced downwardly, moving the valve 173 to its lower valve seat 178, as illustrated in Fig. 1, thus closing communication from the valve chamber 166 to the atmosphere through the exhaust port 179, and again effecting communication from the main reservoir pipe 4 to the valve chamber 166 and the passage 165 through which fluid under pressure flows to the piston chamber 183 of the door engine, either through passage 163 and cavity 159 of the rotary valve 157, if the rotary valve is in the position illustrated in Fig. 1, or through the passage 192 when the rotary valve is in the position illustrated in Fig. 4, thus effecting movement of the piston 184 and the rod 188 toward the left to effect the closing of the car door.

A ball check valve 199 is shown within a chamber 164 in the door valve device 6, which, when the interlock valve 173 is unseated from its lower seat 178 to vent the valve chamber 166 and the passage 165, is moved by the greater pressure on the brake pipe side of the ball check 199 toward its left seat to close communication between the passages 163 and 165 to prevent the piston chamber 183 of the door engine 7 from being vented through cavity 159 of the door valve device when in the position illustrated in Fig. 1. Thus upon a reduction in brake pipe pressure, the pressure in the piston chamber 183 may be correspondingly reduced, but is permitted to be reduced only to brake pipe pressure so long as the valve 157 is in the position illustrated in Fig. 1. In the case of emergency application of the brakes wherein the brake pipe pressure is reduced substantially to zero pressure, a corresponding reduction in the pressure in the piston chamber 183 is permitted, thus eliminating fluid pressure on both sides of the piston 184 of the door engine, thus permitting the door to be opened by hand without any resistance due to fluid pressure in the door engine 7.

It will be apparent to those skilled in the art that many modifications in the apparatus illustrated and described may be made without departing from the spirit of my invention and I do not wish to be limited otherwise than by the scope of the attached claims.

Having now described my invention, what I claim as new and desire to secure by Letters Patent, is:

1. In a brake equipment for vehicles, in combination, a brake cylinder, a control valve device for controlling the supply of fluid under pressure to said brake cylinder and having three spaced movable abutments operatively connected to move in unison, two of said abutments being substantially equal in area, and the third abutment having substantially less area than either of the others, means for supplying fluid under pressure at substantially constant pressure to one side of one of said two abutments, means for normally supplying fluid under pressure to one side of the other of said two abutments at a substantially constant pressure, and means responsive to a reduction in pressure on said last defined abutment for effecting the supply of fluid under pressure to said brake cylinder and to said third abutment at brake cylinder pressure, said abutments being movable in response to build up in brake cylinder pressure to cut off the further supply of fluid under pressure to said brake cylinder.

2. In a brake equipment for vehicles, in combination, a brake cylinder, a control valve device for controlling the supply of fluid under pressure to said brake cylinder and having three spaced movable abutments operatively connected to effect corresponding movements thereof, means for supplying fluid under pressure to two of said abutments to develop balanced opposing forces, the third of said abutments having substantially less area than either of the others, biasing means for urging said abutments to a brake releasing position, said abutments being movable upon a reduction in pressure on one of said above described abutments to a position to effect the supply of fluid under pressure to said brake cylinder and to one side of said third abutment to aid said biasing means, and, upon a predetermined brake cylinder pressure dependent upon the reduction in pressure on one of said abutments, to effect the movement of said abutments to a position to cut off the flow of fluid under pressure to said brake cylinder.

3. In a fluid pressure brake system, in combination, a first movable abutment constituting one wall of a chamber subject to fluid under pressure supplied to a first chamber, a second movable abutment constituting one wall of a chamber subject to fluid under pressure supplied to a second chamber, a third movable abutment constituting one wall of a chamber subject to fluid under pressure supplied to a third chamber according to the degree of application of the brakes, each abutment constituting a wall of one only of said chambers, means for interconnecting said three abutments to effect corresponding movements thereof according to the differential pressures in said three chambers, the pressure in said second and third chambers opposing the pressure in said first chamber, and means actuated upon movement of said abutments in response to a reduction in pressure in said second chamber for effecting an application of the brakes to a degree corresponding to the amount of reduction in pressure in said second chamber as determined by the pressure in said third chamber.

4. In a fluid pressure brake system, in combination, a brake cylinder, a main reservoir, a pipe normally charged with fluid under pressure supplied from the main reservoir, a normally charged brake pipe, a control valve device having a first movable abutment subject on one side to atmospheric pressure and on the other to main reservoir pipe pressure, a second movable abutment subject on one side to atmospheric pressure and on the other to brake pipe pressure, a third movable abutment subject on one side to atmospheric pressure and on the other to brake cylinder pressure, means for interconnecting said three abutments to effect corresponding movements thereof in accordance with the pressures on said three abutments, the pressures on said second and third abutments opposing the pressure on said first abutment, and valve means responsive to a reduction in pressure on said second abutment for effecting the supply of fluid under pressure from said main reservoir pipe to said brake cylinder, and responsive to the build up in pressure in said brake cylinder and against said third abutment depending upon the reduction in pressure on said second abutment for moving said valve to lap position.

5. In a fluid pressure brake system, in combination, a brake cylinder, a normally charged main reservoir pipe, a normally charged brake pipe, a control valve device having a chamber subject to fluid under pressure at main reservoir pipe pressure and having a movable abutment forming one wall thereof, means for opposing the force of said abutment comprising a spring biasing means, a movable abutment forming one wall of a chamber supplied with fluid under pressure at brake pipe pressure, and a chamber supplied with fluid under pressure at brake cylinder pressure and having one movable wall only constituting an abutment, valve means subject to joint movement of said abutments in response to a reduction in brake pipe pressure for supplying fluid under pressure to said brake cylinder and to said last named chamber to effect an application of the brakes in accordance with the amount of reduction in brake pipe pressure.

6. In a fluid pressure brake system, in combination, a brake cylinder, a normally charged main reservoir pipe, a normally charged brake pipe, a control valve device having a plurality of spaced movable abutments connected to effect corresponding movements thereof, means for supplying fluid under pressure at main reservoir pipe pressure to one of said abutments, means for supplying fluid under pressure at brake pipe pressure to another of said abutments acting in opposition to said first named abutment, means for supplying fluid under pressure at brake cylinder pressure to another of said abutments in opposition to said first named abutment, an application relay for controlling the supply of fluid under pressure to said brake cylinder and a release relay for controlling the release of fluid under pressure from said brake cylinder, valve means actuated by said abutment upon a reduction in brake pipe pressure for effecting operation of said application relay to apply the brakes and upon an increase in brake pipe pressure for effecting the operation of said release relay to release the brakes, and an emergency relay operable upon a predetermined reduction in brake pipe pressure for effecting the supply of fluid under pressure to said brake cylinder independently of said valve means.

7. In a brake system for vehicles, in combination, a brake cylinder, a brake pipe, a control valve device responsive to brake pipe pressure and operable to effect an application of the brakes to an extent dependent upon the degree of reduction in brake pipe pressure, a door engine for operating a car door, a manually controllable door valve device for controlling said door engine, and an interlock valve device subject to brake pipe pressure and movable to prevent operation of said door engine to door opening position by said door valve device and operative only upon a predetermined reduction in brake pipe pressure to permit said operation of the door engine.

8. In a brake system for vehicles, in combination, a brake cylinder, a brake pipe, a control valve device responsive to brake pipe pressure and operative to effect an application of the brakes in accordance with the reduction in brake pipe pressure below a predetermined value, a door engine having a piston chamber containing a piston operable to a door closing position upon the supply of fluid under pressure to said chamber and to a door opening position upon the venting of fluid under pressure from said chamber, a door valve device for controlling the supply of fluid under pressure to and the release of fluid under pressure from said piston chamber, and an interlock valve device for preventing the release of fluid under pressure from said chamber by said door valve device when in a door opening position and operative only upon a predetermined reduction in brake pipe pressure to permit the venting of fluid from said chamber.

9. In a brake system for vehicles, in combination, a brake cylinder, a brake pipe, a control valve device responsive to brake pipe pressure and operable to effect an application of the brakes in accordance with a reduction in brake pipe pressure below a predetermined value, a door engine having a movable abutment subject on one side to main reservoir pipe pressure for actuating the abutment to a door closing position and subject on the other side to brake pipe pressure for actuating the abutment to a door opening position when fluid under pressure is vented from the first named side of the abutment, a door valve for controlling the supply of fluid under pressure to and the release of fluid under pressure from said first named side of said abutment, and an interlock valve device subject to brake pipe pressure for preventing the release of fluid under pressure from the first named side of said abutment when the door valve device is in a door opening position until a predetermined reduction in brake pipe pressure has attained.

10. In a brake system for vehicles, in combination, a brake cylinder, a brake pipe, a main reservoir pipe, a control valve device responsive to brake pipe pressure and operable to effect an application of the brakes in accordance with a reduction in brake pipe pressure below a predetermined value, a door engine having a movable abutment subject on one side to main reservoir pipe pressure for actuating the abutment to a door closing position and subject on the other side to brake pipe pressure for actuating the abutment to a door opening position when fluid under pressure is vented from the first named side of the abutment, a door valve for controlling supply of fluid under pressure to and the release of fluid under pressure from said first named side of said abutment, an interlock valve device having a valve and spring weighted piston subject on one side to brake pipe pressure and on the other side to main reservoir pressure and operable above a predetermined brake pipe pressure to close communication from said first named side of said abutment to atmosphere through said door valve device when in a door opening position, and upon a predetermined reduction in brake pipe pressure to open said communication.

11. In a brake system for vehicles, in combination, a brake cylinder, a brake pipe, a main reservoir pipe, a control valve device responsive to brake pipe pressure and operable to effect an application of the brakes in accordance with a reduction in brake pipe pressure below a predetermined value, a door engine having a movable abutment subject on one side to main reservoir pipe pressure for actuating the abutment to a door closing position and subject on the other side to brake pipe pressure for actuating the abutment to a door opening position when fluid under pressure is vented from the first named side of the abutment, a door valve for controlling the supply of fluid under pressure to and the release of fluid under pressure from said first named side of said abutment, an interlock valve device subject to the difference in main reservoir pipe pressure and brake pipe pressure for closing communication from the first named side of said abutment to the atmosphere through said door valve device when in a door opening position until a predetermined reduction in brake pipe pressure has attained, a check valve in said door valve device subject to brake pipe pressure and the pressure applied to said first named side of said abutment for permitting a reduction in pressure thereinto, but not below, brake pipe pressure when the door valve device is in its door closing position.

12. In a brake equipment for vehicles, in combination, a brake cylinder, a main reservoir pipe normally charged with fluid under pressure, a brake pipe normally charged with fluid under pressure, means for controlling brake pipe pressure comprising a brake valve device having a pair of spaced movable abutments connected by a common stem to effect corresponding movements thereof and subject respectively to main reservoir pipe and brake pipe pressures and valve means operated by said abutments for controlling the supply of fluid under pressure from said main reservoir pipe to said brake pipe and from said brake pipe to the atmosphere, a control valve device responsive to brake pipe pressure and operable to effect a supply of fluid under pressure to said brake cylinder in accordance with a reduction in brake pipe pressure below a predetermined value, a door engine for operating a car door, a manually controlled door valve device for controlling the door engine, and an interlock valve subject to brake pipe pressure and operative to prevent operation of said door engine by said door valve device when the brake pipe pressure is above a predetermined value.

13. In a brake equipment for vehicles, in combination, a brake cylinder, a main reservoir pipe normally charged with fluid under pressure, a brake pipe normally charged with fluid under pressure, means for controlling brake pipe pressure comprising a brake valve device having a pair of spaced movable abutments connected by a common stem to effect corresponding movements thereof and subject respectively to main reservoir pipe and brake pipe pressures and valve means operated by said abutments for controlling the supply of fluid under pressure from said main reservoir pipe to said brake pipe and from said brake pipe to the atmosphere, a control valve device responsive to brake pipe pressure and operable to effect the supply of fluid under pressure to said brake cylinder in accordance with a reduction in brake pipe pressure below a predetermined value, a door engine having a piston chamber containing a piston and operable to a door closing position upon the supply of fluid under pressure to said piston chamber and to a door opening position upon the venting of said chamber, a door valve device for controlling the supply of fluid under pressure from and to said piston chamber and an interlock valve device for preventing the venting of said piston chamber by said door valve device when in a door opening position if the brake pipe pressure is above a predetermined amount.

14. In a brake equipment for vehicles, in combination, a brake cylinder, a main reservoir pipe normally charged with fluid under pressure, a brake pipe normally charged with fluid under pressure, means for controlling brake pipe pressure comprising a brake valve device having a pair of spaced movable abutments connected by a common stem to effect corresponding movements thereof and subject respectively to main reservoir pipe pressure and brake pipe pressure and valve means for controlling the supply of fluid under pressure from said main reservoir pipe to said brake pipe and from said brake pipe to the atmosphere, a control valve device responsive to brake pipe pressure and operable to effect the supply of fluid under pressure to said brake cylinder in accordance with a reduction in brake pipe pressure below said predetermined value, means for operating a car door comprising a chamber normally charged with fluid under pressure, a manually operable valve for venting said chamber to effect movement of said operating means to a door opening position, and automatic means for preventing the venting of said chamber by said manually operable means.

15. In a brake equipment for vehicles, in combination, a brake cylinder, a control valve device for controlling the supply of fluid under pressure to said brake cylinder and having three spaced movable abutments operatively connected to move in unison, one of said abutments being subject only to a substantially constant fluid pressure, another of said abutments being subject only to brake pipe pressure, and the third of said abutments being subject only to brake cylinder pressure, and means responsive to movement of said abutments upon a reduction in brake pipe pressure for effecting the supply of fluid under pressure to said brake cylinder and to said third abutment at brake cylinder pressure, said abutments being movable in response to build up in brake cylinder pressure to cut off the further supply of fluid under pressure to said brake cylinder.

16. In a brake equipment for vehicles, in combination, a brake pipe, a brake cylinder, a control valve device for controlling the supply of fluid under pressure to said brake cylinder and having a plurality of chambers each having one movable wall only forming a movable abutment, two of said abutments being subject, respectively, to the pressure of the brake pipe and a substantially constant fluid pressure arranged in position, and one abutment being subject to the pressure of fluid supplied to the brake cylinder, and means operated by said abutments upon a reduction in brake pipe pressure for supplying fluid under pressure to the brake cylinder, said means being operated by said abutments upon an increase in brake cylinder pressure to cut off the further supply of fluid under pressure to said brake cylinder.

17. In a brake equipment for vehicles, in combination, a brake pipe, a brake cylinder, a control valve device for controlling the supply of fluid under pressure to said brake cylinder and having two movable abutments of substantially equal area arranged to exert opposing forces and subject, respectively, to brake pipe pressure and a substantially constant fluid pressure, said abutments being held in spaced relation by rods connecting points adjacent their peripheries, an intermediate abutment contained in the space between said above named two abutments and operatively connected to move therewith, said intermediate abutment being subject to the pressure of fluid supplied to the brake cylinder, means operated by said abutments upon a reduction in brake pipe pressure for supplying fluid under pressure to the brake cylinder, said means being operated by said abutments upon an increase in brake cylinder pressure to cut off the further supply of fluid under pressure to said brake cylinder, and yielding resistance means opposing movement of said abutments to operate said means for supplying fluid under pressure to the brake cylinder.

JOSEPH C. McCUNE.

CERTIFICATE OF CORRECTION.

Patent No. 2,088,530. July 27, 1937.

JOSEPH C. McCUNE.

It is hereby certified that error appears in the printed specification of the above numbered patent requiring correction as follows: Page 8, first column, line 54, claim 14, after "means" insert the words operated by said abutments; and second column, line 31, claim 16, for "position" read opposition; and that the said Letters Patent should be read with these corrections therein that the same may conform to the record of the case in the Patent Office.

Signed and sealed this 19th day of October, A. D. 1937.

Henry Van Arsdale.
(Seal)                 Acting Commissioner of Patents.